(12) United States Patent
Sheares

(10) Patent No.: US 6,515,101 B1
(45) Date of Patent: Feb. 4, 2003

(54) HIGH PERFORMANCE FLUORINATED POLYMERS AND METHODS

(75) Inventor: Valerie V. Sheares, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/404,260

(22) Filed: Sep. 22, 1999

Related U.S. Application Data

(60) Provisional application No. 60/101,896, filed on Sep. 25, 1998.

(51) Int. Cl.[7] .............................................. C08G 73/24

(52) U.S. Cl. ........................ 528/401; 528/397; 528/485; 528/480

(58) Field of Search ................................ 528/401, 397, 528/485, 480

(56) References Cited

U.S. PATENT DOCUMENTS

| | | | |
|---|---|---|---|
| 4,503,254 A | | 3/1985 | Kelleghan |
| 5,227,457 A | | 7/1993 | Marrocco, III et al. |
| 5,260,162 A | * | 11/1993 | Khanna et al. ............. 430/190 |

OTHER PUBLICATIONS

Ismael Colon et al., "Coupling of Aryl Chlorides by Nickel and Reducing Metals," Union Carbide Corporation, Technical Research Center, American Chemical Society, 1986, vol. 51, pp. 2627–2637.

Virgil Percec et al., "Synthesis of Functional Poly(P–Phenylenes) from Substituted Hydroquinones via Nickel–Catalyzed Coupling of their Bistriflates," Macromolecules, vol. 25, No. 6, 1992, American Chemical Society, pp. 1816–1823.

Virgil Percec et al., "Regioregular and Regioirregular Poly(P–Phenylenes) via Ni(0)–Catalyzed Homocoupling of Arylkene Bismesylates," Macromolecules, 1996, American Chemical Society, vol. 29, pp. 3727–3735.

Virgil Percec et al., "Regioregular and Regioirregular Poly(P–Phenylenes) via $CF_3$ and $ocf_3$ Substituents to Generate a Model for Rigid–Rod Polymers," Macromolecules, 1996, vol. 29, pp. 7284–7293.

Virgil Percec et al., "Synthesis and Ni(0)–Catalyzed Oligomerization of Isomeric 4,4'''–Dichloroquarterphenyls," Journal of Polymer Science: Part A, Polymer Chemistry, vol. 31, 1993, pp. 877–884.

M. Ueda et al., "Synthesis of Poly(3–Phenyl–2, 5–Thiophene) by Nickel–Catalyzed Coupling Polymerization of 3–Phenyl–2,5–Dichlorothiophene," Macromolecules, 1991, American Chemical Society, vol. 24, pp. 2694–2697.

I. Colon et al., "High Molecular Weight Aromatic Polymers by Nickel Coupling of Aryl Polychlorides," Journal of Polymer Science: Part A, Polymer Chemistry, 1990, vol. 28, pp. 367–383.

M. Ueda et al., "Synthesis of Aromatic Poly(Ether Sulfone)S by Nickel–Catalyzed Coupling Polymerization of Aromatic Dichlorides," Polymer Journal, vol. 23, No. 4, 1991, pp. 297–303.

M. Ueda et al., "Synthesis of Aromatic Poly(Ether Ketone)S by Nickel–Catalyzed Coupling Polymerization of Aromatic Dichlorides," Macromolecules, 1990, vol. 23, Yamagata University, Department of Polymer Chemistry, pp. 926–930.

(List continued on next page.)

Primary Examiner—Duc Truong
(74) Attorney, Agent, or Firm—Dickstein Shapiro Morin & Oshinsky LLP

(57) ABSTRACT

Fluorinated oligomers, polymers, and copolymers including poly[[1,1 '-biphenyl]-4,4'-diyl[2,2,2-trifluoro-1-(trifluoromethyl)ethylidene]] and other compounds useful for high performance polymer, electronic, aerospace, coatings, and high temperature gas separation applications. Also provided are methods for synthesizing fluorinated polymer derivatives.

64 Claims, 8 Drawing Sheets

OTHER PUBLICATIONS

H. Ghassemi et al., "Synthesis of Poly(Arylene Phosphine Oxide) by Nickel–Catalyzed Coupling Polymerization," Polymer, vol. 38, No. 12, 1991, pp. 3139–3143.

A. Pasquale et al., "Poly(P–Phenylene) Derivatives Via Ni–Catalyzed Coupling of Aromatic Dichlorides," Department of Chemistry, Iowa State University.

A. Pasquale et al., "Alkyl–Substituted Poly(2,5–Benzophenones) Synthesized Via Ni(0)–Catalyzed Coupling of Aromatic Dichlorides and their Miscible Blends," Department of Chemistry, Iowa State University, 1997–98, pp. 1–8.

A. Pasquale et al., "Poly(P–Phenylenes) Containing Sulfone Pendant Groups Via Ni(0) Catalyzed Coupling of Aromatic Dichlorides," Department of Chemistry, Iowa State University (2 pages).

J. Wang et al., "Synthesis and Characterization of Soluble Poly(3–P–Substituted)Benzoyl–2,5–Thiophene) Derivatives," Department of Chemistry, Iowa State University, pp. 240–241.

J. Wang et al., "Poly(3–Benzoyl–2,5–Thiophene) Via Nickel–Catalyzed Coupling Polymerization," Department of Chemistry, Iowa State University, pp. 263–264.

J. Wang et al., "Novel Poly[3–(P–Substituted)Benzoyl–2,5–Thiophenes] Via Nickel(0)–Catalyzed Coupling Polymerization," Macromolecules 1998, vol. 31, No. 20, 1998, American Chemical Society, pp. 6769–6775.

H. Kobayashi et al., "Surface Properties of Fluorosilicones," Reviews, Dow Corning Toray Silicone Co., Ltd.

G. Lyle et al., "Synthesis and Characterization of Poly(Arylene Ethers) Derived from 1,1–Bis–(4–Hydroxyphenyl)–1–Phenyl–2,2,2–Trifluoroethane," Virginia Polytechnic Institute and State University, Department of Chemistry, pp. 238–239.

P. Havelka–Rivard et al., "Synthesis and Characterization of Poly [[1,1'–Biphenyl]–4,4'–Diyl[2,2,2–Trifluoro–1–(Trifluoromethyl) Ethylidene]]," Department of Chemistry, Iowa State University, pp. 2–9.

T. Matsuura et al,. "Polyimides Derived from 2,2'Bis(Trifluoromethyl)–4,4'–Diaminobiphenyl . . . ," Macromolecules, 1992, American Chemical Society, vol. 25, pp. 3540–3545.

M. Hellums et al., "Fluorinated Polycarbonates for Gas Separation Applications," Journal of Membrane Science, Elsevier Science Publishers, vol. 46, 1989, pp. 93–112.

M. Coleman et al., "Isomeric Polyimides Based on Fluorinated Dianhydrides and Diamines for Gas Separation Applications," Journal of Membrane Science, vol. 50, 1990, pp. 285–297.

A. Morisato et al., "Gas Separation Properties of Aromatic Polyamides Containing Hexafluoroisopropylidene Groups," Journal of Membrane Science, 104, 1995, Elsevier Science B.V., pp. 231–241.

S. Alexander Stern, "Polymers for Gas Separations: The Next Decade," Journal of Membrane Science, Review, vol. 94, 1994, pp. 1–65.

S.A. Sterns et al., "Performance of a Versatile Variable–Volume Permeability Cell . . . ," Journal of Appl. Polymer Science, vol. 7, 1993, pp. 2035–2051.

Yaw–Terng Chern, "Low Dielectric Constant Polyimides . . . ," Macromolecules, 1998, American Chemical Society, vol. 31, pp. 5837–5844.

N. Murthy et al., "Structure of the Amorphous Phase in Crystallizable Polymers: Poly(Ethylene Terephthalate)," Macromolecules, 1991, American Chemical Society, vol. 24, pp. 1185–1189.

Sheng–Hsien Lin et al., "Organo–Soluble Polyimides: Synthesis and Polymerization . . . ," Macromolecules, 1998, American Chemical Society, vol. 31, pp. 2080–2086.

Richard E. Lyon et al., "A Pyrolysis–Combustion Flow Calorimeter Study of Polymer Heat Release Rate," Galaxy Scientific Corporation, $9^{th}$ Annual BCC Conference on Flame Retardancy, 1998, pp. 2–15.

A. Morisato et al., "Polymer Characterization and Gas Permeability . . . ," Journal of Polymer Science: Part B, Polymer Physics, vol. 34, 1996, pp. 2209–2222.

I Pinnau et al., "Transport of Organic Vapors Through Poly(1–Trimethylsilyl–1–Propyne)," Journal of Membrane Science, 116, 1996, pp. 199–209.

S. A. Stern et al., "Structure–Permeability Relationships in Silicone Polymer," Journal of Polymer Science: Part B, Polymer Physics, vol. 25, 1987, pp. 1263–1298.

S. Takada et al., "Gas Permeability of Polyacetylenes Carrying Substituents," Journal of Applied Polymer Science, vol. 30, 1995, pp. 1605–1616.

B. D. Freeman et al., "Polymeric Materials for Gas Separations," American Chemical Society, 1999, Chapter 1, pp. 1–26.

V. M. Shah et al., "Solubility of Carbon Dioxide, Methane, and Propane in Silicone Polymers . . . ," Journal of Polymer Science: Part B, Polymer Physics, 1993, vol. 31, pp. 313–317.

T. Hirose et al., "Gas Transport in Poly[Bis(Trifluoroethoxy)Phosphazene]," Journal of Appl. Polymer Science, vol. 38, 1989, pp. 809–820.

L. M. Robeson, "Correlation of Separation Factor Versus Permeability for Polymeric Membrane," Journal of Membrane Science, vol. 62, 1991, pp. 165–185.

D. R. Paul et al., "Polyberic Gas Separation Membranes", CRC Press, Boca Raton, FL. 1994, pp. 83.

D. W. Breck, "Zeolite Molecular Sieves", Wiley: New York, 1974, p. 636.

P.A. Havelka–Rivard, et al., Synthesis and Characterization of Poly [[1,1'–biphenyl]–4,4'–diyl[2,2,2–trifluoro–1–(trifluoromethyl)ethylidenel] 1999, pp. A–H.

Sheares et al"New materials via Ni(o) catalyzed coupling polymerization", Apr. 2, 1998, Chem Abstract 129: 290460.*

Havelka et al "Synthesis of poly[[1,1'–biphenyl]–4,4'–diyl [2,2,2–trifluoro–1–(trifluoromethyl) ethylidene]] by nickel catalyzed coupling polymerization", 1998, Chem Abstract 128: 244452.*

* cited by examiner

HIGH PERFORMANCE FLUORINATED POLYMERS AND METHODS

This application claims priority from U.S. Provisional Application No. 60/101,896, filed Sep. 25, 1998, which is hereby incorporated by reference herein in its entirety.

FIELD OF THE INVENTION

This invention relates to substituted fluorinated aromatic-based polymers having at least one trifluoromethyl or hexafluoroisopropylidene group in the polymer backbone and methods for using and preparing fluorinated monomers, oligomers, and polymers for high performance polymer, electronic, aerospace, coatings, high temperature gas separation, and other applications.

BACKGROUND OF THE INVENTION

Fluorinated polymer derivatives are of considerable interest due to their unique combinations of electrical and electrooptical properties, thermal stability, and structural versatility. The structures of the starting materials, synthetic methods, physical treatments, and chemical modifications can significantly impact the performance of fluorinated polymer derivatives for specific applications.

Fluorinated polymer derivatives have been synthesized using a number of chemical routes. However, previous fluorinated polymer derivatives have been limited, at least in part, because fluorinated polymers typically have low solubilities. Because of the trade-off between solubility and thermal stability, previous methods have produced materials with relatively poor solubility and/or poor thermal stability. Similarly, previous methods have required high temperatures to effect an efficient polymerization reaction.

While prior fluorinated polymers have exhibited some advantageous properties, they have not had combined properties such as increased solubility, high gas permeability, flexibility, low absorption of water, transparency and fire resistance, while retaining thermal stability. In addition, characterization of previous fluorinated high performance polymers has been limited by interference by other functional groups incorporated in the polymer (ketones, ethers, imides, sulfones, etc.).

What is needed are new fluorinated high performance polymers, oligomers, and copolymers, and block copolymers that combine high solubility, transparency, high gas permeability, low absorption of water, and fire resistance while retaining enhanced thermal stability, exceptional flexibility and transparency, and methods for synthesizing such compounds.

SUMMARY OF THE INVENTION

This invention provides new fluorinated high performance polymers and methods for preparing high yields of soluble fluorinated polymer derivatives having enhanced thermal stability and other properties, such as low dielectric constant and minimal moisture absorption, making such polymers useful for a wide range of electronic, aerospace, and other applications.

The fluorinated monomers used to prepare the fluorinated polymers of the invention include, but are not limited to Compounds Ia, Ib, Ic, Id, Ie, If, Ig, Ih and Ij as described below. The fluorinated polymers of the invention include, but are not limited to Compounds IIa, IIb, IIc, IId, IIe, IIf, IIg(1), IIg(2), IIh, IIi and IIj as described below and also include various oligomers, copolymers, and block copolymers made from dihalogenated aromatic-based monomers and/or oligomers.

Also provided herein are methods for synthesizing fluorinated oligomers, polymers, copolymers, and block copolymers. Monomers used to prepare the polymers of the invention may be prepared via any suitable method which provides reasonably high yields. The preferred polymers, copolymers, and block copolymers are prepared via nickel-catalyzed coupling polymerization. The resulting fluorinated polymer derivatives have benzene and fluorine linkages incorporated into the polymer backbone and are suprisingly quite soluble in a variety of solvents, while maintaining high thermal stability and other properties that make the resulting polymer and copolymer materials particularly suitable for a wide range of high performance polymer applications.

Additional objects and advantages of the present invention will be set forth in part in the description that follows, and in part will be obvious from the description, or may be learned through the practice of the invention. The objects and advantages of the invention will be attained by means of the instrumentalities and combinations particularly pointed out in the appended claims.

DETAILED DESCRIPTION OF PREFERRED EMBODIMENTS

Figure 1:
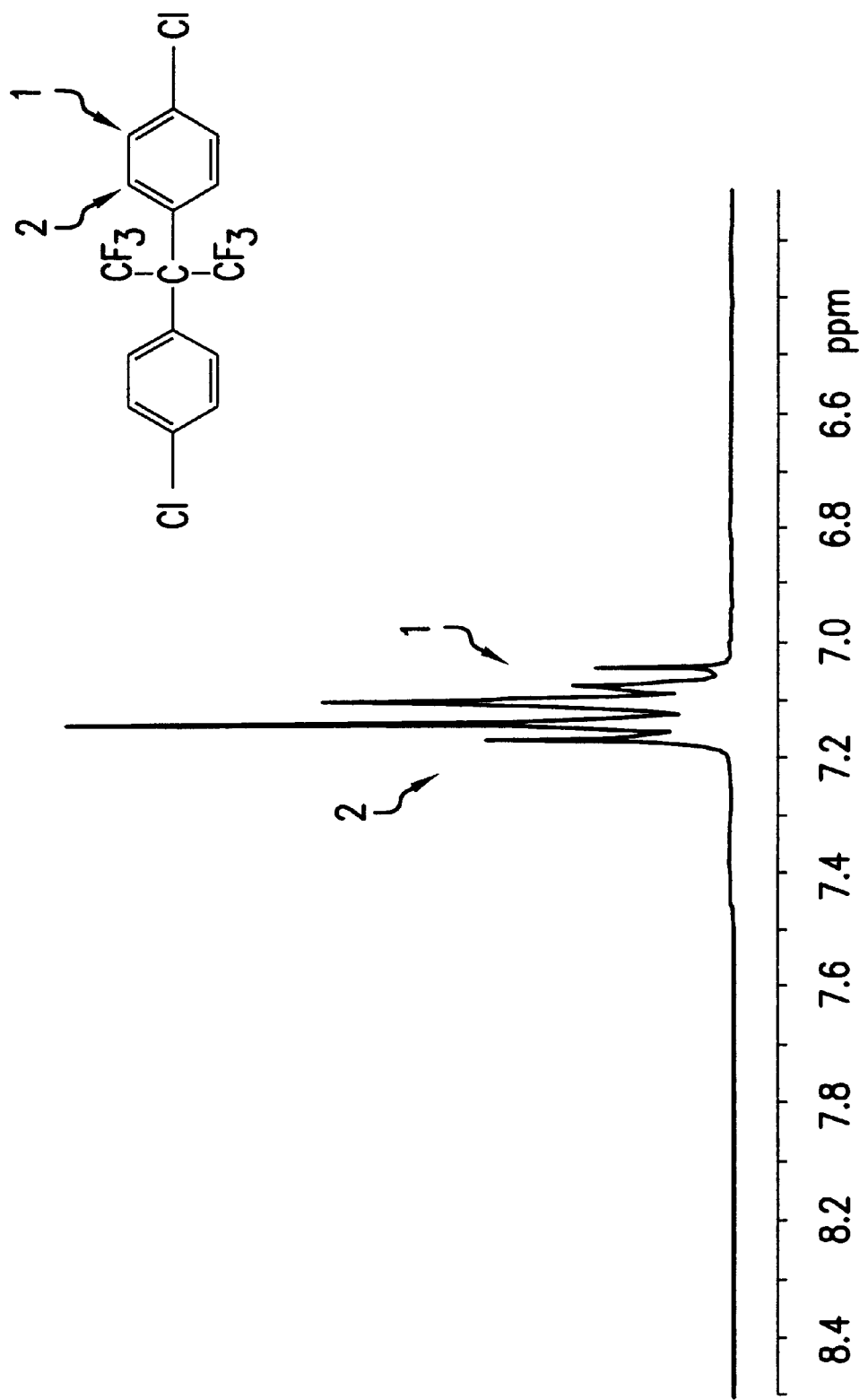
FIG. 1 shows the proton NMR of 2,2-bis(p-chlorophenyl)hexafluoropropane prepared according to the invention.

Reference will now be made in detail to the presently preferred embodiments of the invention, which together with the following examples, serve to explain the principles of the invention.

The present invention provides functionalized monomers selected from dihalogenated aromatic-based monomers with at least one $CF_3$ group including, but not limited to, the following:

Compound Ia
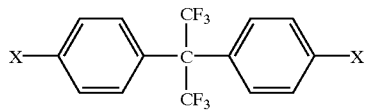

Compound Ib
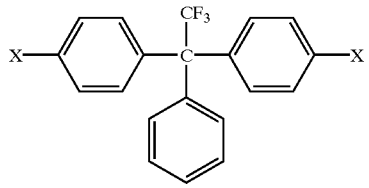

Compound Ic
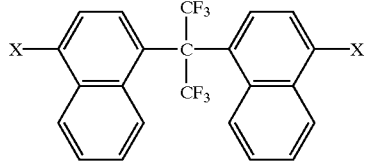

Compound Id
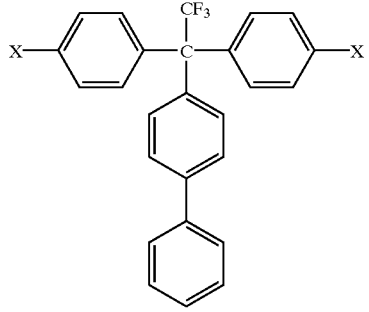

Compound Ie
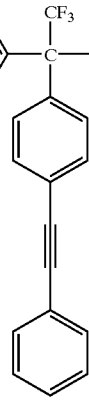

Compound If
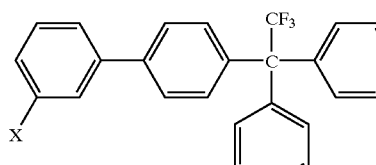

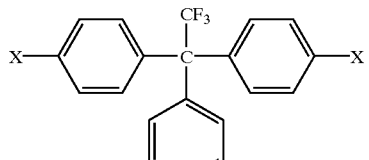

-continued

Compound Ig
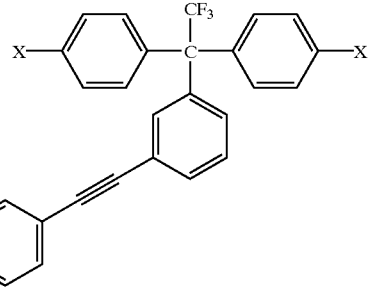

Compound Ih
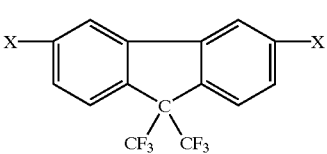

Compound Ii
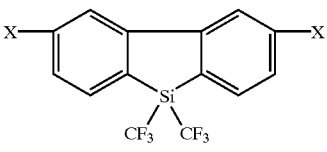

Compound Ij
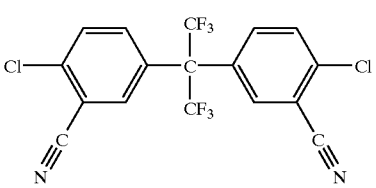

wherein X is a halogen.

The monomers described and utilized by this invention are disubstituted, dihalogenated aromatic-based compounds with at least one $CF_3$ group and, optionally, various other groups that are sufficient to provide amorphous, soluble polymers. Such other groups that may be incorporated in the fluorinated monomers described by the invention include, but are not limited to, additional benzene rings and alkyls. The fluorinated monomers can be combined with comonomers or can be used to prepare oligomers of several, typically 2 to 20, repeating units of aromatic-based compounds having functional groups wherein at least one of the functional groups is substituted with a $CF_3$ group with a halogen on each end of such oligomer. The fluorinated oligomers according to the invention may be prepared by nickel(0) catalyst coupling or via any suitable method, and then subsequently polymerized with various other comonomers via the polymerization processes described below.

The comonomers include any monomer that can participate in nickel(0) catalyst coupling polymerization, i.e., any aromatic-based compound having a halogen on each end, preferably Cl or Br. A currently preferred comonomer is disubstituted benzene, although virtually any dihalogenated aromatic-based compound may be used.

The term "aromatic-based" herein means any compound that includes at least one aromatic component. The aromatic-based compounds contemplated by the invention contain only carbon, benzene and/or fluorine. Furthermore, the aromatic-based compounds are incorporated into the polymer backbone and not placed in other positions on the polymer or copolymer molecules. In order to provide the beneficial combination of desirable properties described herein, it is preferred that substantially no other functionality besides that provided by carbon, benzene or fluorine groups be incorporated into the backbone of the polymers and copolymers of the invention. Therefore, the preferred polymers and copolymers of the invention contain substantially no amide, imide, or ester linkages, nor substantially any nitrogen or oxygen.

In addition, because this invention describes a method utilizing nickel(0) catalyst coupling, as described in Ueda et al, *Macromolecules,* 24, 2694 (1991), hereby incorporated by reference herein in its entirety, the selected monomers and comonomers must be compatible with the nickel catalyst. For example, compounds containing acidic hydrogen, nitro groups and alkoxy groups are not compatible and are not preferred. Nickel(0) catalyst coupling has not previously been applied to fluorinated monomers as described below.

An especially preferred fluorinated monomer is 2,2-bis (p-chlorophenyl)hexafluoropropane (Compound Ia, wherein X=Cl). Any of the above fluorinated monomers, including, but not limited to, compounds Ia, Ib, Ic, Id, Ie, If, Ig, Ih and Ii may be utilized as starting materials for the oligomers and polymers described herein. These monomers or oligomers (i.e., at least two repeating units of an aromatic-based compound with at least one $CF_3$ group, preferably with a halogen on each end of the oligomer) may also be incorporated with other aromatic-based monomers to create copolymers with altered and enhanced properties. These enhanced properties include particularly enhanced solubility, thermal stability, conductivity, and improved processability, as compared to polymers prepared without the fluorinated monomers or oligomers as taught herein. The term "copolymer" as used herein includes terpolymers and any other polymers that contain at least one aromatic-based compound with at least one $CF_3$ group unit according to the invention together with any number, typically one to three, of other aromatic-based monomeric units.

Fluorinated monomers and oligomers for use in the preparation of polymers and copolymers herein are preferably synthesized by the techniques discussed below, although any suitable method may be used. This invention, including the polymers and polymerization products and processes of the invention, should be understood as not being limited to the following preferred monomers or monomer syntheses.

Fluorinated monomers are preferably synthesized via the nucleophillic substitution reaction of dibromotriphenylphosphorane and 4,4'-(hexafluoroisopropylidene)-diphenol substituted benzoyl chlorides.

A typical monomer synthesis is shown in Scheme 1 below. Dichlorotriphenylphosphorane (35.7 g, 107 mmol) and 4,4'-(hexafluoroisopropylidene)diphenol (18.1 g, 53.6 mmol) are added to a 250 ml round-bottom flask equipped with a nitrogen inlet, placed in a heating mantel, insulated with sand, and heated to 350° C. for four hours and then cooled to room temperature. Any other suitable heating temperature may be used as long as the temperature is below the boiling point of all reaction ingredients. Typically, temperatures will be in the range of 25° C. to 125° C. The resulting monomers are then isolated by any suitable means, preferably by dissolving them in methylene chloride, elution through a short, basic aluminum oxide column using hexane as the eluting solvent, followed by distillation.

Scheme I

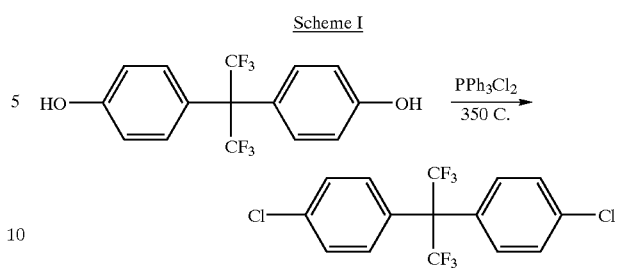

Polymerizations according to this invention and recovery of polymer may be carried out according to various methods involving nickel(0) catalyst coupling. The currently preferred methods of polymerization are described in detail below, although various choices of solvent, preferably dipolar apiotic solvents, and various amounts of catalyst, bipyridine, triphenylphosphine, salts, such as sodium or potassium iodide, and various temperatures and reaction times may be used as may be readily determined by one of ordinary skill in the art for specific monomer(s), oligomers, and reaction mixtures given the teachings herein.

Preferred polymerization reactions are described in Scheme 2 below. Polymerization is performed using nickel (0)-catalysis as a polymer-forming reaction. The nickel(0) catalyst may be generated in situ, as discussed below, from nickel chloride, triphenylphosphine, zinc, and bipyridine (optional). Alternatively, the nickel(0) catalyst may be purchased from a variety of sources. The resulting polymer materials may be recovered by any suitable means, preferably using a solvent such as DMPU, dMAC, NMP, etc., to dissolve the zinc and by products of the nickel catalyst polymerization method.

Scheme 2

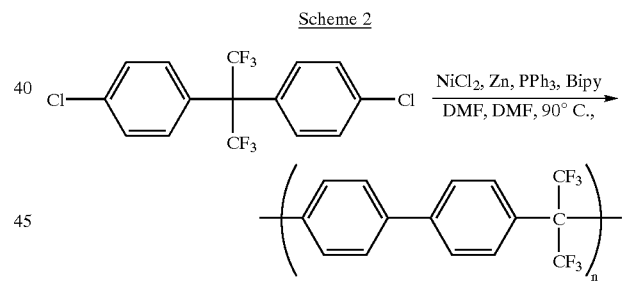

In general, the present invention provides aromatic-based polymers with at least one $CF_3$ group including, but not limited to the following:

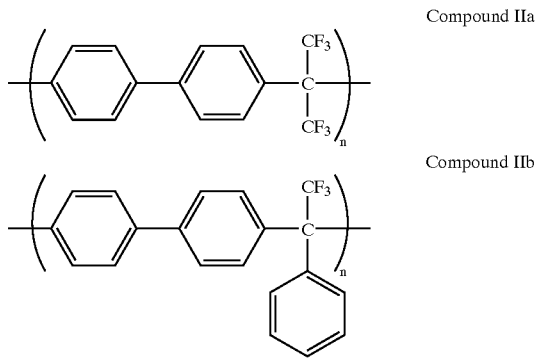

Compound IIa

Compound IIb

Compound IIc

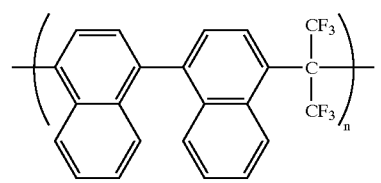

Compound IId

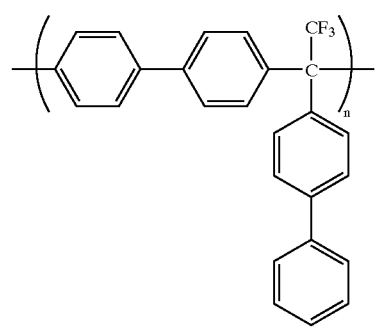

Compound IIe

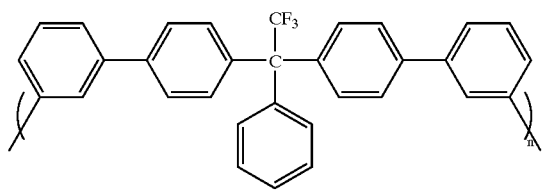

Compound IIf

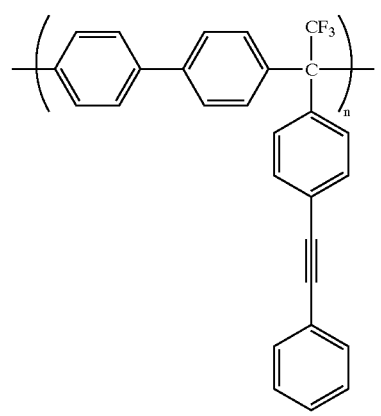

Compound IIg(1)

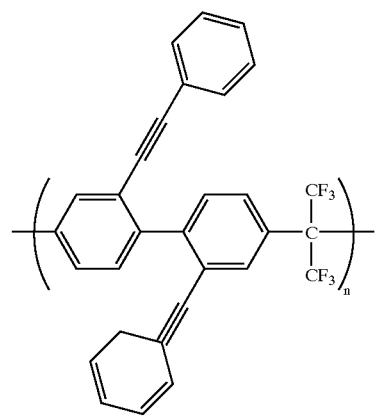

Compound IIg(2)

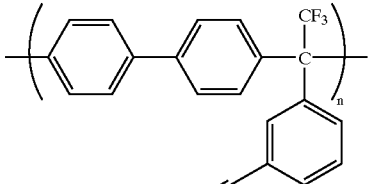

Compound IIh

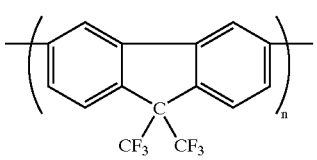

Compound IIi

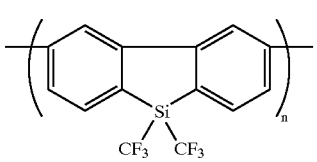

Compound IIj

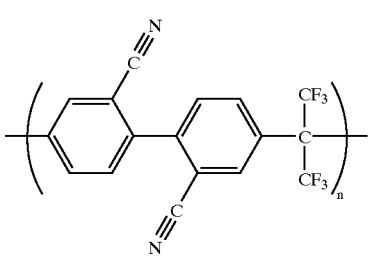

Other groups that may be incorporated in the fluorinated polymers of the invention include, but are not limited to, additional benzene rings and alkyls.

Fluorinated polymers of the invention may illustratively have at least one unit selected from the following group:

Compound IIIa

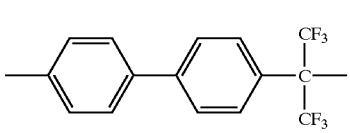

Compound IIIb

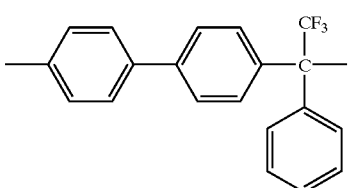

Compound IIIc

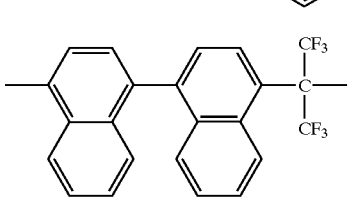

-continued

Compound IIId
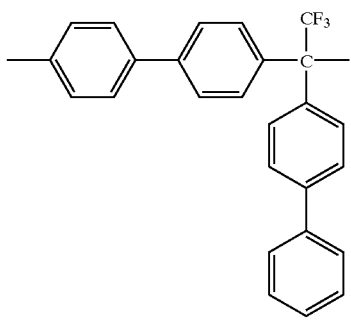

Compound IIIe
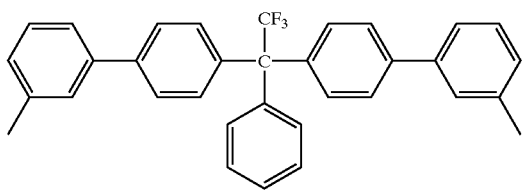

Compound IIIf
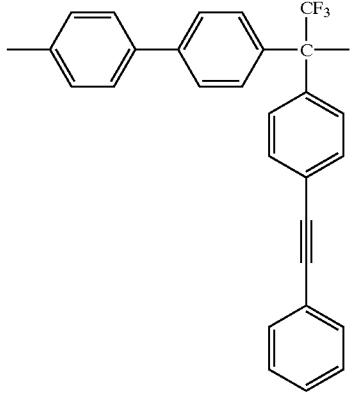

Compound IIIg(1)
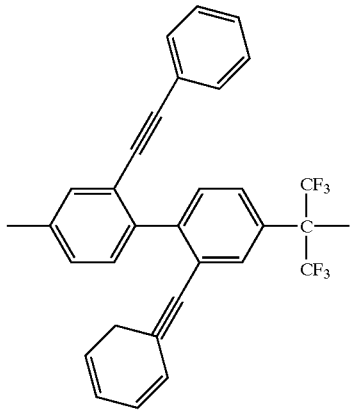

Compound IIIg(2)
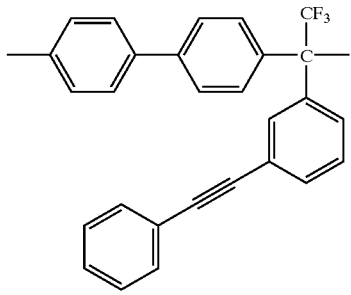

-continued

Compound IIIh
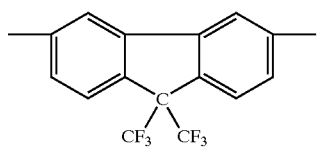

Compound IIIi
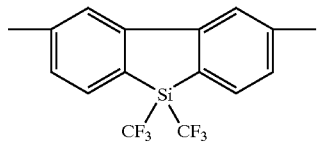

Compound IIIj
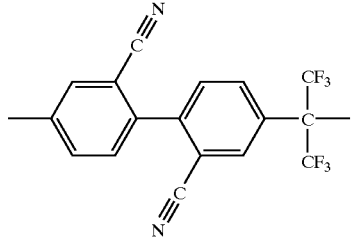

In accordance with the method taught by the invention the following monomers polymerize to form the following homopolymers: 2,2-bis(p-chlorophenyl)hexafluoropropane (Compound Ia wherein X=Cl), polymerizes to form Compound IIa, Poly[[1,1'-biphenyl]-4,4'-diyl[2,2,2-trifluoro-1-(trifluoromethyl)ethylidene]]; Compound Ib polymerizes to form Compound IIb; Compound Ic polymerizes to form Compound IIc; Compound Id polymerizes to form Compound IId; Compound Ie polymerizes to form Compound IIe; Compound If polymerizes to form Compound IIf; Compound Ig polymerizes to form Compound IIg(1) or IIg(2); Compound Ih polymerizes to form Compound IIh; Compound Ii polymerizes to form Compound IIi; Compound Ij polymerizes to form Compound IIj.

The homopolymers and copolymers of the invention contain anywhere from about 1% to about 100% repeating units comprising the fluorinated monomers discussed herein, including, e.g., 1 to 50%, or 1 to 10% fluorinated monomer. The fluorine incorporated into the resulting backbone of the polymer or copolymer may be via individual fluorinated monomer units or via fluorinated oligomers having at least two, preferably 2 to 20, fluorinated units as discussed above. Such oligomers are conveniently prepared by the same nickel(0) catalyst technique, while limiting the amount of catalyst or otherwise reducing chain growth by any other suitable method.

The fluorinated polymers and copolymers provided by the present invention are high-performance polymers possessing good solubility. The thermal stability of the compounds is also enhanced over previous attempts at similar polymers. The exceptionally low dielectric constant of the fluorinated polymers of the invention provides excellent insulating properties. These polymers have many applications including, for example, inner layer dielectrics, gas separation membranes, anti-fouling coatings, and optical fiber claddings. Specific properties are described in the Example below.

EXAMPLE

Materials: All reagents were purchased from Aldrich and used as received unless otherwise indicated. Dipyridyl and triphenylphosphine were purified by recrystalization from ethanol. All compounds synthesized were purified until their $^1$H NMR spectra corresponded to the expected structure and purity was greater than 99% by DSC melting point and GC/MS.

2,2-Bis(p-chlorophenyl)hexafluoropropane (Compound Ia): Dichlorotriphenylphosphorane (35.7 g, 107 mmol), and 4,4'(hexafluoroisopropylidene)diphenol (18.1 g, 53.6 mmol) were added to a 250 mL round bottom flask equipped with a nitrogen inlet. The flask was placed in a heating mantel, insulated with sand and heated to 350 °C. for 4h. The reaction temperature was monitored with a thermocouple. The brown reaction mixture was cooled to room temperature and dissolved in methylene chloride. The resulting solution was eluted through a short basic aluminum oxide column using hexane as the eluting solvent. The product was distilled and 12.4 g (33.2 mmol, 62%) of white solid formed: mp=60° C. (DSC); $^1$H-NMR: δ 7.35 (d, J=8.7 Hz, 4H), 7.29 (d, J=8.7 Hz, 4H); $^{13}$C-NMR; δ 135.89 (C-4), 132.72 (C-1), 131.73 (C-3), 128.87 (C-2), 124.12 (quartet, J=1140 Hz, C-6), 64.55 (septet, J=102.3 Hz, C-5); $^{19}$F-NMR δ–60.58 (singlet); $^{31}$P-NMR showed only the reference peak. The theoretical weight percents are 48.29% C and 2.14% H. Elemental analysis showed 48.25% C and 2.16% H. Theoretical mass was calculated to be 371.99073 g/mol; high resolution mass spectrometry showed a measured mass of 371.99044 g/mol with a deviation of –0.78 ppm.

Poly[[1,1'-biphenyl]-4.4'diyl[2,2,2-trifluoro-1-(trifluoromethyl)ethylidene]] (Scheme 2) (Compound IIa) was synthesized in the following manner. Zinc (2.17 g, 3.32×10$^-$mol), nickel chloride (0.104 g, 8.03×10$^{-4}$ mol), triphenylphosphine (2.8 g, 1.07×10$^{-2}$ mol), and dipyridyl (0.1253 g, 8.03×10$^{-4}$ mol) were added to a three-necked 250 mL pear-shaped flask equipped with an overhead stirrer. N,N-Dimethylformamide (DMF) (10 mL) was added via syringe and the mixture was stirred at 80° C. until a deep red-brown color was observed. At that time, 2,2-bis (p-chlorophenyl)hexafluoropropane (4.00g, 1.07×10$^{-2}$ mol) was added. The reaction continued at 90° C. for 72 hours. The catalyst was quenched by pouring the reaction mixture into 400 mL of 25% HCl/methanol solution and stirred overnight. The polymer was filtered and rinsed with a 10% sodium bicarbonate solution, dissolved in 30 mL of chloroform and reprecipitated in 400 mL of methanol. The polymerization gave 95% yield of a white powder. $^1$H-NMR: δ 7.62 (d, J=8.1 Hz, 4H), 7.50 (d, J=8.1 Hz, 4H); $^{13}$C-NMR: δ 140.51 (C-4), 133.00 (C-1), 130.84 (C-3), 126.94 (C-2), 124.28 (quartet, J=1134 Hz, C-6), 64.41 (septet, J=100.8 Hz, C-5); $^{19}$F-NMR δ–60 (singlet); $^{31}$P-NMR showed only the reference peak. The theoretical weight percents are 59.61% C and 2.67% H. Elemental analysis showed 59.38% C and 2.59% H.

Characterization

A Bruker 400 MHz spectrometer was utlized to perform $^1$H NMR, $^{13}$C NMR, $^{19}$F NMR (using hexafluorobenzene as the reference), and $^{31}$P NMR (using phosphoric acid as the reference) measurements in CDCl$_3$. A Varian gas chromatograph fitted with a Finnigan Mat Magnum mass spectrometer was used for product identification and purity confirmation. High resolution mass spectrometry was performed with a Kratos MS50TC at a resolution (R) of 14,300 in electron impact (EI) mode with an electron beam energy of 70 eV. Monomer melting points and polymer glass transition temperatures were determined using a Perkin-Elmer Pyris 1 differential scanning calorimeter (DSC) at a heating rate of 20° C./min and a heating range of 25° C. to 350° C., with nitrogen purge. Glass transition temperatures were reported as the inflection point of the change in heat capacity during the second heat. Thermogravimetric analyses (TGA) were performed on a Perkin-Elmer TGA with heating rates of 10° C./min. Molecular weights were determined by gel permeation chromatography (GPC) and multiple angle laser light scattering (MALLS) using a Waters gel permeation system coupled with a Wyatt miniDAWN. The chromatography system was equipped with three Waters styragel columns and measurements were made at 40° C. with THF as the solvent at a flow rate of 1.0 mL/min. Molecular weights (GPC) were calculated with a calibration plot constructed with polystyrene standards. The UV-Vis absorption spectrum was obtained with a Shimadzu UV-2101PC UV-Vis scanning spectrophotometer. Elemental analysis of the monomer and polymer was performed using a Perkin-Elmer model 2400 Series II CHN/S instrument. Wide-angle X-ray diffraction (WAXD) experiments were conducted using a Phillips diffractometer. Diffraction data were collected in the range 10°<2θ<75° with a step size of 0.05° (2θ) and a counting time of 10 seconds per step using Cu Kα radiation. The contact angle was measured using a Ram □-Hart goniometer equipped with an image analysis attachment.

Thin polymer films were prepared by dissolving 0.15 grams of polymer in 4 mL of chloroform followed by pouring into a 5×60 mm evaporating dish. The films were allowed to form overnight, and dried to remove residual solvent. Film density was determined based on film weight and volume at ambient conditions. The density data were used to characterize chain packing by estimating the fractional free volume (FFV), which was calculated using the following relation:

$$FFV = \frac{V - 1.3\, V_w}{V}$$

where V is the polymer specific volume, and $V_w$ is the specific van der Waals volume calculated using the group contribution method suggested by Van Krevelen. Van Krevelen, D. W., *Properties of Polymers*, 3$^{rd}$ edition, Elsevier, Amsterdam, 1990. Pure gas permeabilities of these polymer films were determined at 35° C. using the constant pressure/variable volume method. Stern, S. A., *J. Membrane Sci.* 1994, 94, 1. The gases used were hydrogen, helium, nitrogen, oxygen, methane, and carbon dioxide. The feed pressure was 50 psig except for methane (methane: 100 psig), and the permeate pressure was maintained at 0 psig [i.e., $p_2-p_1$=50 psig=3.4 atm, $P_2-P_1$=100 psig=6.8 atm (methane)]. The permeability coefficients are reported in Barrers, where 1 Barrer=10$^{-10}$ cm$^3$(STP)cm/(cm$^2$.s.cm Hg).

A detailed description of the preferred synthesis of representative monomer 2,2-Bis (p-chlorophenyl) hexafluoropropane follows. 2,2-bis(p-chlorophenyl) hexafluoropropane is prepared in accordance with the description of U.S. Pat. No. 4,503,254, hereby incorporated by reference, which describes the nucleophilic substitution reaction of dibromotriphenylphosphorane and 4,4' (hexafluoroisopropylidene )-diphenol. 2,2-bis(p-chlorophenyl)hexafluoropropane is soluble in hexane, chloroform, acetone, tetrahydrofuran, methylene chloride, N,N-dimethylformamide, N,N-dimethylacetamide, dimethylsulfoxide, methanol, and partially soluble in ethanol. Due to the monomer's high solubility, recrystallization is difficult. Therefore, it is preferred to purify the monomer by distillation to insure polymer grade monomer. The monomer exhibits a sharp melting point at 60° C., as determined by DSC. The GC-MS shows only one peak in the gas chromatogram. In the mass spectrum, the parent peak along with characteristic fragment peaks were present. High resolution mass spectra and elemental analysis data further confirmed the chemical composition of 2,2-bis(p-chlorophenyl)hexafluoropropane.

Figure 2:
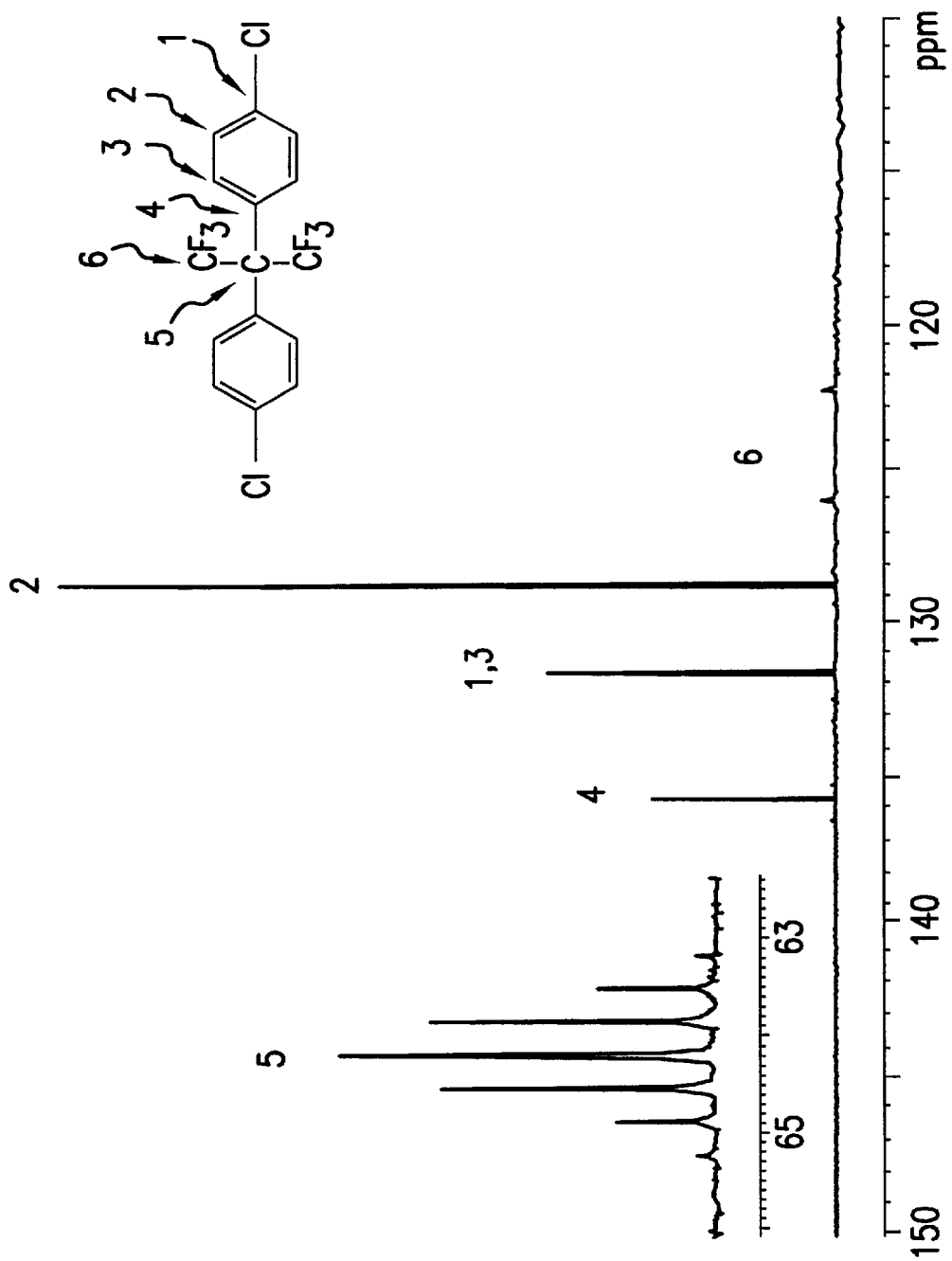
FIG. 2 shows the carbon NMR of 2,2-bis(p-chlorophenyl)hexafluoropropane prepared according to the invention.

NMR verified the chemical structure of 2,2-bis(p-chlorophenyl)hexafluoropropane. Proton NMR (FIG. 1) showed two doublets. The doublet at δ 7.35 was further split by ortho-benzene coupling, while the doublet at δ 7.29 was broadened by the $CF_3$ groups. $^{13}C$ NMR (FIG. 2) showed a quartet for C-6, and the quaternary aliphatic carbon, C-5, was split into a septet due to the two $CF_3$ groups. Carbons marked as 1 and 3 gave very similar chemical shifts in the monomer and appeared to be one peak in the carbon NMR spectrum. Correct assignments for each proton were made with the aid of 2D NMR.

A detailed description of the preferred synthesis of representative fluorinated polymer poly[[1,1'-biphenyl]-4,4'-diyl[2,2,2-trifluoro-1-(trifluoromethyl)ethylidene]] (Compound IIa) follows. For the polymerization of Compound Ia to Compound IIa, it is preferred to use the procedure disclosed in Colon, I.; Kelsey, D. R *J. Org. Chem.* 1986, 51, 2627 hereby incorporated by reference. Given the teachings herein, specific reaction conditions for the polymerization of Compound Ia or any of the monomers contemplated by the invention can be optimized by one of skill in the art by varying the solvent, solvent volume, reaction time, temperature, and catalyst ratio. It is preferred to use excessively pure and dry reagents, N,N-dimethylformamide as the polymerization solvent; add a molar equivalent of triphenylphosphine to the monomer; and add excess zinc in the ratio of 3.1:1 to monomer to make high molecular weight polymer. A reaction time of 72 hours is also preferred. Comparisons of $^{19}F$ NMR and $^{31}P$ NMR of 2,2-bis(p-chlorophenyl)hexafluoropropane (Compound Ia wherein X=Cl) (the monomer) and Compound IIa (the polymer) demonstrated that $CF_3$ groups are still present following polymerization and no side reactions occur. For both samples only the reference peak of the phosphoric acid was observed in $^{31}p$ NMR. $^{19}F$ NMR showed a singlet at δ–60.58 for the monomer and a singlet at δ–60.27 for the polymer.

Figure 3:
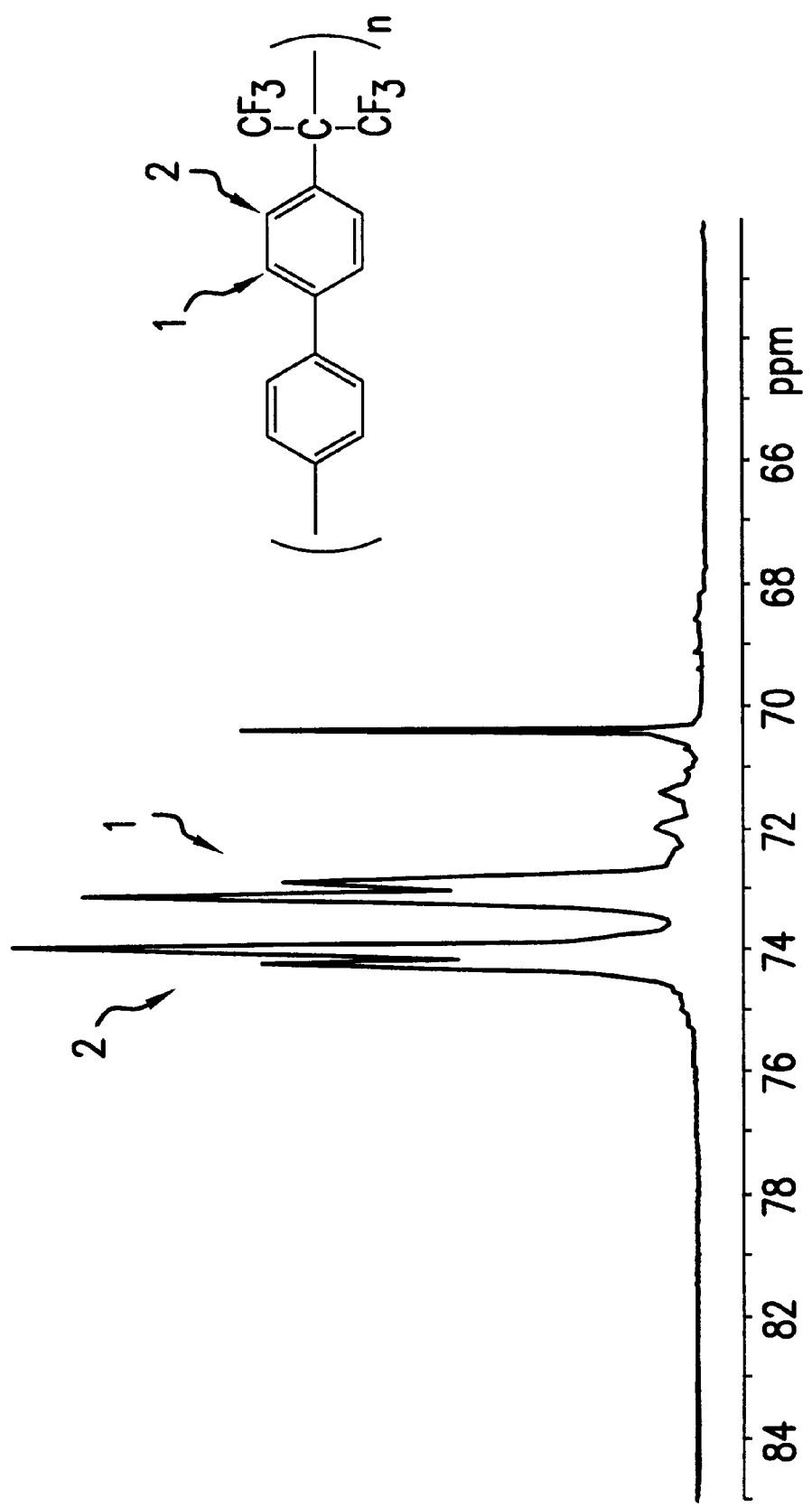
FIG. 3 shows the proton NMR of Poly[[1,1'-biphenyl]-4,4'-diyl[2,2,2-trifluoro-1-(trifluoromethyl)ethylidene]] (Compound IIa) prepared according to the invention.
Figure 4:
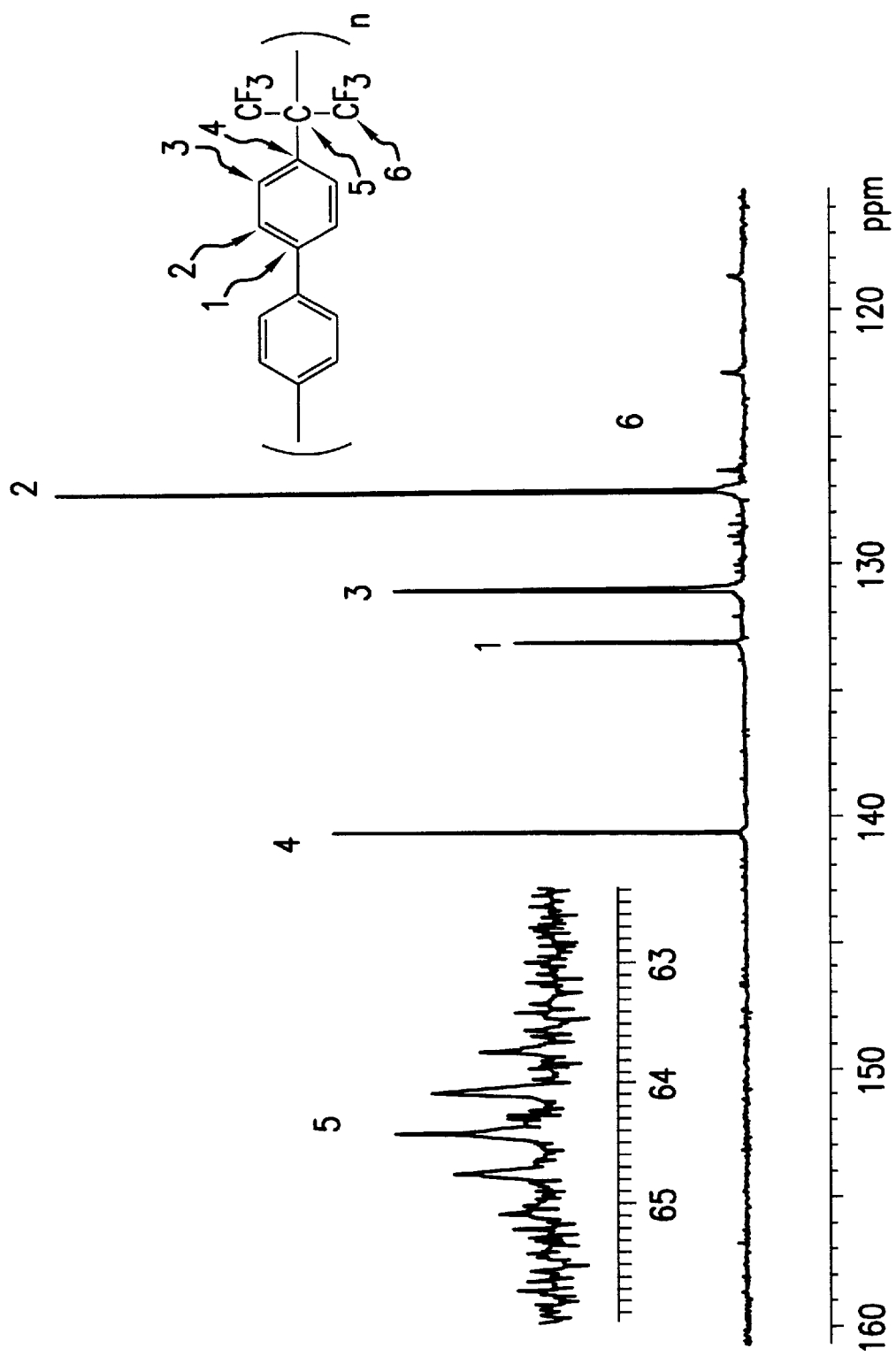
FIG. 4 shows the carbon NMR of Compound IIa prepared according to the invention.
Figure 5:
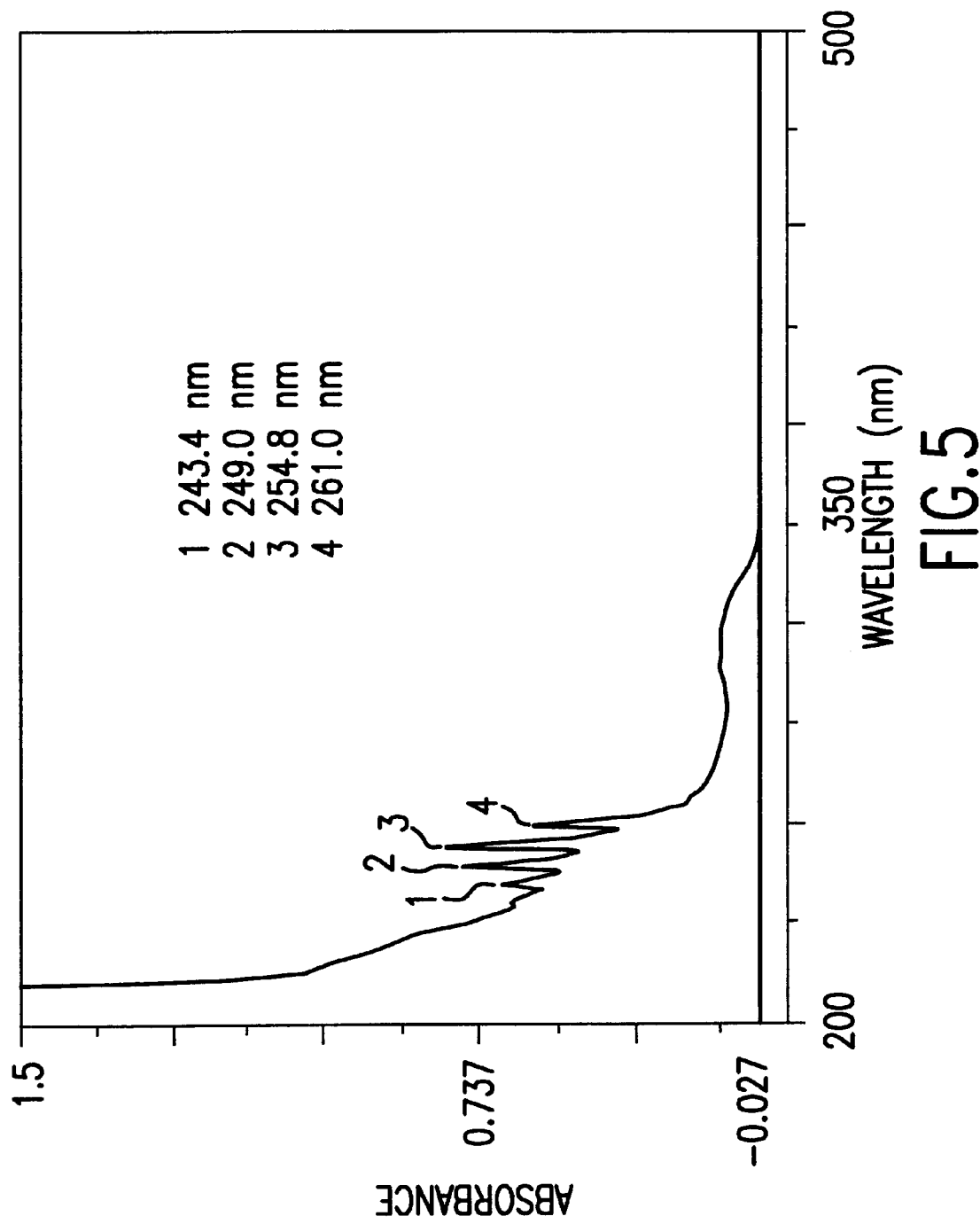
FIG. 5 shows the UV-vis trace of Compound IIa prepared according to the invention. The results clearly demonstrate that Compound IIa is colorless and transparent.

The chemical structure of IIa was verified by NMR and UV-Vis spectroscopies. Proton NMR (FIG. 3) showed two doublets and two broad smaller peaks. The doublet peaks were broader than the peaks present in the spectra of the monomer 2,2-bis(p-chlorophenyl)hexafluoropropane, and no longer show any effects of ortho coupling. Each of the two smaller peaks present between δ 7.1 and δ7.2 are attributed to polymer end groups and used to calculate the degree of polymerization. $^{13}C$ NMR (FIG. 4) shows a quartet for the $CF_3$ groups and a septet for the quaternary aliphatic carbon due to the $CF_3$ groups. Carbons marked as 1 and 3 are separated because of a chemical shift following formation of compound IIa. The small peaks present between δ 127–129 are attributed to end groups. 2D NMR was used to verify the correct assignments in the proton NMR. The polymer is white with a $\lambda_{max}$ value of 254.8 nm in chloroform solution, and no absorption occurs above 340 nm (FIG. 5). Thus, the fluorinated polymers of the invention are advantageously colorless. In contrast, prior reported polyimides containing the BisAF (2,2-bis(4-hydroxyphenyl) hexafluoropropane) units were pale yellow in color, signifying longer conjugation lengths than those of Compound IIa. See e.g. Chern, Y. *Macromolecules* 1998, 31, 5844.

Surprisingly, Compound IIa is completely soluble at room temperature in a number of common organic solvents such as chloroform, acetone, tetrahydrofuran, methylene chloride, N,N-dimethylformamide. Compound IIa is insoluble in hexane, methanol, and ethanol.

Figure 6:
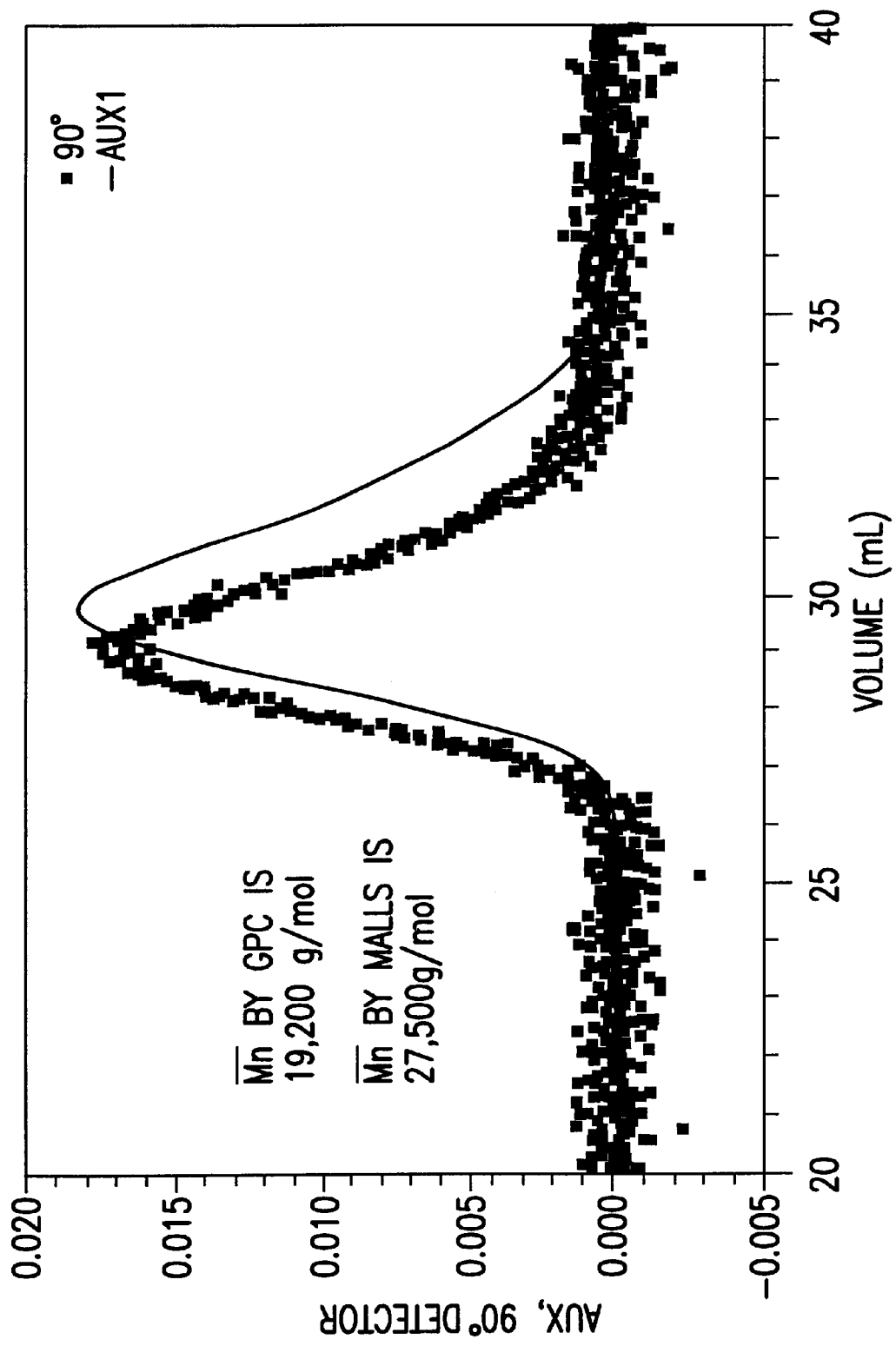
FIG. 6 shows the GPC and MALLS chromatograms of Compound IIa prepared according to the invention.

Compound IIa has a number average molecular weight of $19.2 \times 10^3$ g/mol by GPC and $27.5 \times 10^3$ g/mol by MALLS (dn/dc=0.075 ml/g in THF at 40° C.). The degree of polymerization (DP) determined by light scattering is 91. This result is in accord with the DP of 95 calculated from end group analysis by proton NMR. The GPC and MALLS chromatograms are shown in FIG. 6. Poly(2,5-benzophenone)s previously prepared had lower molecular weight values by MALLS than by GPC. Pasquale, A. J.; Sheares, V. V. *J. Polym. Sci., Part A. Polym. Chem.* 1998, 36, 2611. The hydrodynamic volume for such rigid rod polymers probably influences the molecular weight correlations resulting in a large deviation between the two methods. Since the GPC data reflect the hydrodynamic volume based on polystyrene standards, the MALLS data more accurately reflect the molecular weight of Compound IIa. Compound IIa has a polydispersity index of 1.61 by GPC and 1.25 by MALLS. The deviation from the theoretical value of 2.0 is consistent with other polymers prepared by Ni-(0) catalysis and may be due to the loss of some lower molecular weight polymer during workup. Percec, V.; Zhao, M.; Bae, J.; Hill, D. H. *Macromolecules* 1996, 29, 3727; Grob, M. C.; Feiring, A. E.; Auman, B. C.; Percec, V.; Zhao, M.; Hill, D. H. *Macromolecules* 1996, 29, 7284; Pasquale, A. J.; Sheares, V. V. *J. Polym. Sci., Part A. Polym. Chem.* 1998, 36, 2611; Lyle, G. E.; Grubbs, H.; Ichatchoua, T.; McGrath, J. E. *Polym. Prepr. (Am. Chem. Soc., Polym. Mat. Sci. and Eng.)* 1993, 69, 238.

Figure 7:
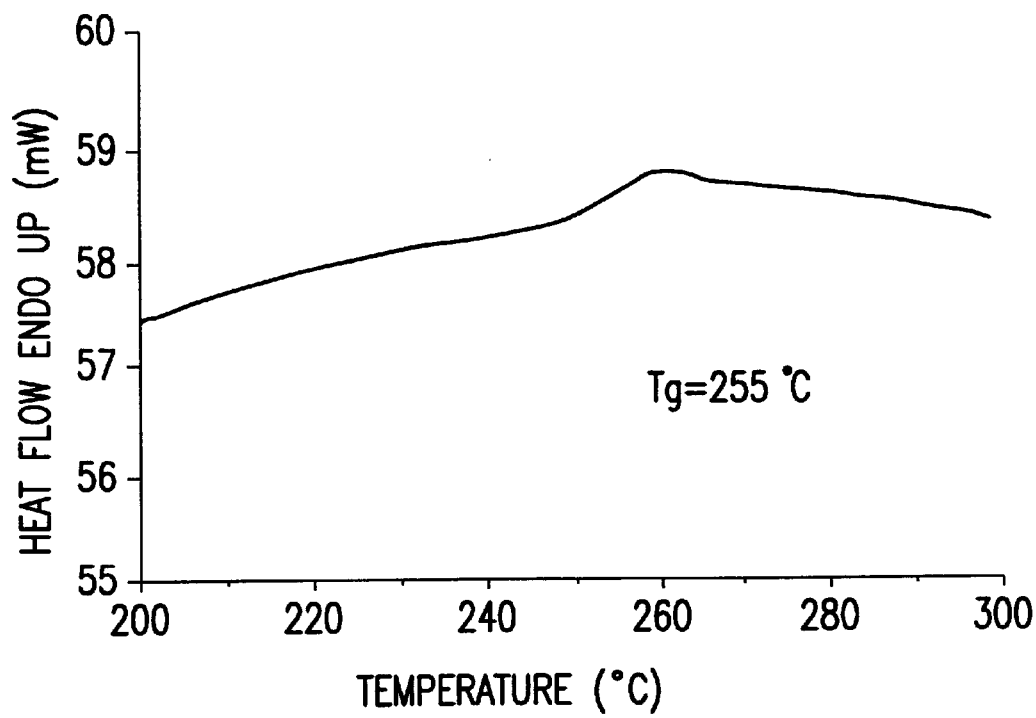
FIG. 7 shows the DSC thermogram of Compound IIa prepared according to the invention and indicates a glass transition temperature of 255° C., which demonstrates excellent thermal properties.
Figure 8:
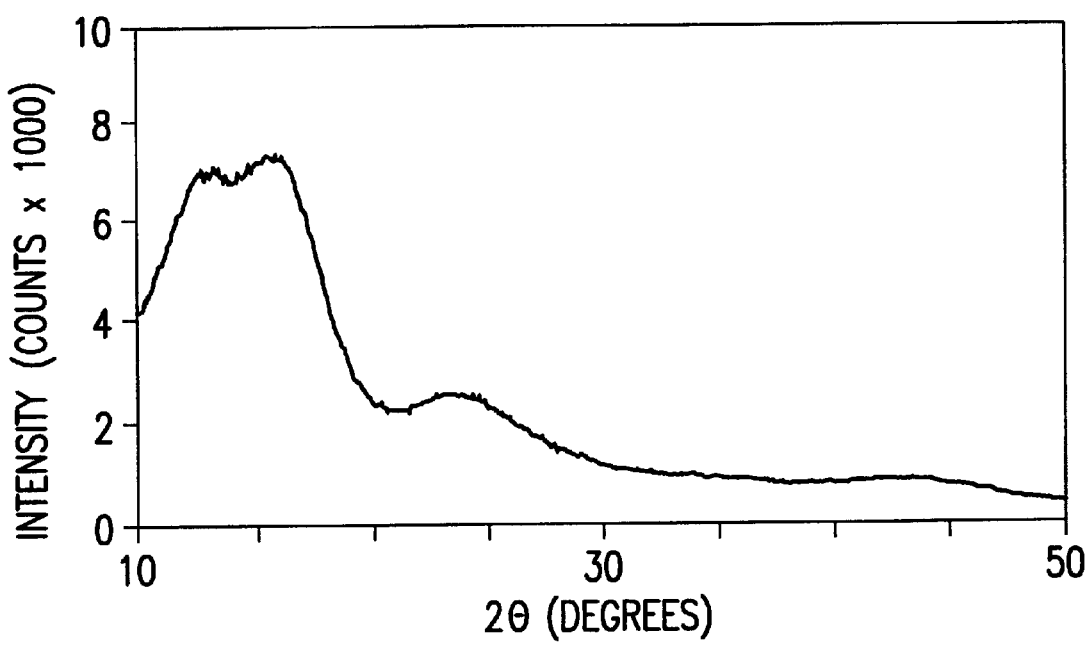
FIG. 8 shows the WAXD pattern of Compound IIa prepared according to the invention.
Figure 9:
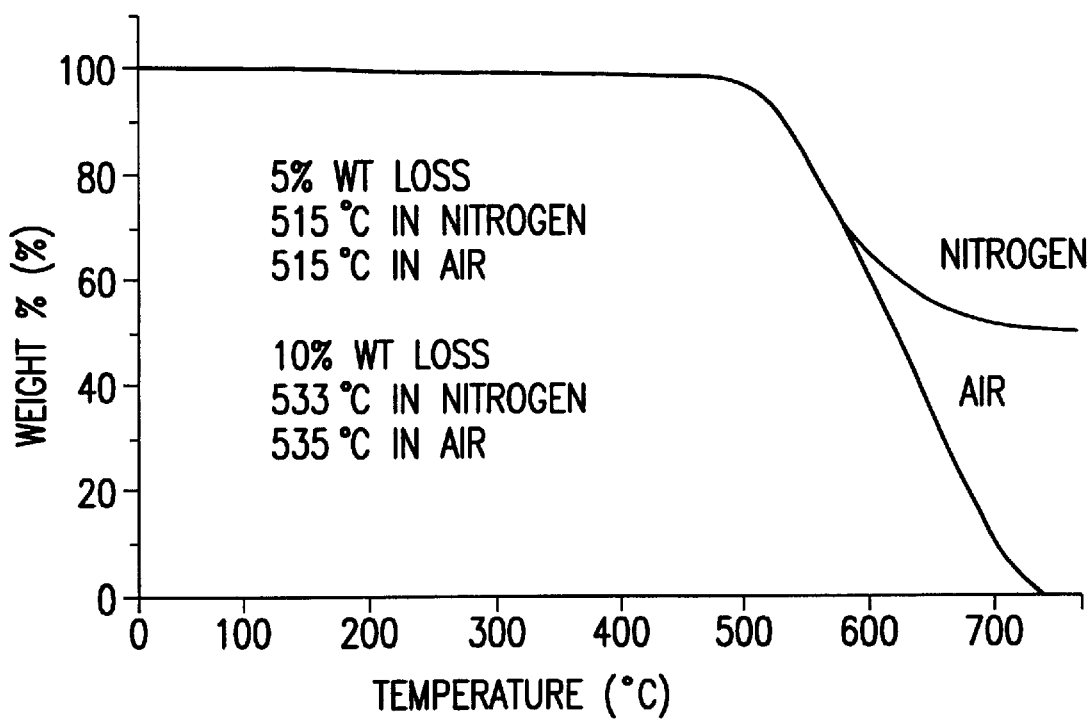
FIG. 9 shows a TGA thermogram of Compound IIa prepared according to the invention. The figure indicates a 5% weight loss at 515° C. in nitrogen and air and a 10% weight loss at 533° C. in nitrogen and 535° C. in air, which demonstrates excellent thermal stability.

Compound IIa has a glass transition temperature ($T_g$) of 255° C., as shown in FIG. 7. The glass transition temperature range of the preferred polymers of the invention is generally about 200° C. to about 350° C. In contrast, prior art polymers such as poly(arylene ether sulfone) with the same BisAF component has a substantially lower $T_g$, 180° C., presumably due to the flexible ether linkages. Compound IIa exhibits no evidence of crystallinity by DSC or by wide-angle X-ray diffraction as shown in FIG. 8. Thermogravimetric analysis, FIG. 9, showed 5% weight loss values at 515° C. for both nitrogen and air. It also showed 10% weight loss values at 533° C. in nitrogen and 535° C. in air. Compound IIa and the other polymers of the invention generally show a 10% weight loss value in nitrogen and oxygen at temperatures up to about 500 ° C. The excellent thermal stability of Compound IIa is comparable to the polyimide based on 2,2'-bis(trifluoromethyl)-4,4'-dianimobiphenyl and 1,4-bis(trifluoromethyl)-2,3,5,6-benzene tetracarboxylic dianhydrides. See Lin, S.; Li, F.; Cheng, S. Z.; Harris, F. W. *Macromolecules* 1998, 31, 2080. This particular polyimide has a $T_g$ of 332° C. and 5% weight loss at 569° C. in nitrogen and 549° C. in air. Compound IIa has only slightly lower 10% weight loss numbers. Suprisingly, Compound IIa has much better solubility than these polyimides while retaining excellent thermal stability. The combination of the solubility and thermal stability greatly improves the processing and utility of the fluorinated polymers of the invention.

Isothermal gravimetric analysis was performed on Compound IIa as shown in Table 1. It is important to note that at 300° C. and 350° C., virtually no weight loss occurs. After 100 hours at 400° C., only 0.03% of the initial weight is lost . These results further demonstrate the excellent thermal stability of the fluorinated polymers of the invention.

TABLE 1

Isothermal Gravimetric Analysis of Poly[[1,1'-biphenyl]-4,4'-diyl[2,2,2-trifluoro-1-(trifluoromethyl)ethylidene]](Compound IIa)[a]

| Temperature (° C.) | Initial Weight (mg) | Final Weight (mg) | % Wt loss/hr |
|---|---|---|---|
| 300 | 12.059 | 12.059 | 0 |
| 350 | 4.966 | 4.948 | $3.6 \times 10^{-5}$ |
| 400 | 7.722 | 7.484 | 0.031 |

[a]Data collected for 100 hours in nitrogen at indicated temperature.

Compound IIa has a heat release capacity of 25 J/g-K, a total heat of combustion of volatiles of 3.3 kj/g-solid, and a pyrolysis residue of 50.4% at 650° C. The residual mass fraction was determined by a rapid heating rate of 200° C./min to 650° C. followed by an isothermal hold for a period of 5 minutes according the disclosures of the following articles hereby incorporated by reference: Lyon, R. E.; Waters, R. N. "A Pyrolysis-Combustion Flow Calorimeter for the Study of Polymer Heat Release Rates" *Ninth Annual BCC Conference on Flame Retardancy* Stanford, Ct., Jun. 1–3, 1998; Lyons, R. E. *Fire-Resistant Materials: Progress Report* DOT/FAA/AR-97/100 1998; Lyon, R. E.; Waters, R. N. "A Microscale Combustion Calorimeter for Determining Falmmability Parameters of Materials" 42nd *IntOI SAMPE Synposium and Exhibition Anaheim*, Calif., May 5–8, 1997. Table 2 compares the residual mass fraction of several fire resistant polymers, obtained from Federal Aviation Administration (FAA) data, with Compound IIa. Compound IIa is comparable to other high performance polymers with respect to microscale heat release capacity. Furthermore, the fire resistant values for compound IIa surpass the values for RADEL R® (polyphenylsulfone), and are more comparable to TORLON® (polyamideimide). Although TORLON® exceeds the char yields of Compound IIa, Compound IIa does surpass the FAA char yield requirement of 45%. The FAA's future goal is to find a material with a heat release capacity of 8 J/g-K, a total heat of combustion of volatiles of 1 kJ/g-solid, and a pyrolysis residue of 45% at 650° C. Compound IIa has slightly higher values for the heat release capacity and total heat of combustion for the FAA's fixture goals. However, based on existing correlations Compound IIa would be expected to meet or exceeds the FAA's current requirement for flaming heat release rate when tested according to FAR 25.853(a-1) Heat Release Rate Test for Aircraft Cabin Materials. Therefore, the preferred polymers and copolymers of the invention demonstrate excellent fire-resistant properties.

TABLE 2

Polymer Flammability[a]

| Polymer | Heat Release Capacity (J/g-K) | Total Heat Released (KJ/g) | Char Yield (%) |
|---|---|---|---|
| Nylon 6-6 | 348 | 32 | 0 |
| PMMA | 297 | 25 | 0 |
| KEVLAR® | 170 | 14 | 35 |
| RADEL R® | 92 | 12 | 52 |
| TORLON® | 28 | 6 | 64 |
| Compound IIa | 25 | 3 | 50 |
| KAPTON® | 14 | 4 | 66 |
| PBO | 3 | 1 | 97 |

[a]Data taken from the FAA Data Base on Fire Resistant Materials.

Water absorption data and contact angles were measured for Compound IIa. After 100 hours submerged in distilled water, films cast from Compound IIa showed virtually no increase in weight at temperatures of 25, 35, 45, and 55° C. Thus, Compound IIa is hydrolytically stable. At 8, 12 and 24 hours in boiling water, the films showed no detectable changes in appearance or weight or other forms of degradation. With the highly nonpolar aromatic rings and the hydrophobic fluorine atoms, the films do not absorb significant amounts of moisture. Immediately after a drop of water was placed on a film cast from Compound IIa, the contact angle measured was 73.9°.

The dielectric constant for Compound IIa was 2.56. Several fluorinated polyimides showed higher dielectric constants ranging from 2.6 to 3.2. See Matsuura, T.; Ishizawa, M.; Hasuda, Y.; Nishi, S. *Macromolecules* 1992, 25, 3540. However, moisture absorption was cited as a problem. Once the polyimides absorbed moisture the dielectric constants increased to 2.8 to 3.6. In sharp contrast, the highly hydrophobic nature of the compounds of the invention ensures that the dielectric constant will not be significantly influenced by humidity.

Films of Compound IIa prepared from a chloroform solution were transparent (see FIG. 5), flexible, and creasible. This result is exceptional since compounds exhibiting high thermal stability are typically very inflexible, and colored. The fractional free volume (FFV) was estimated to be 0.29 using an average film density of 1.24 g/cm³. Based on repeated measurements of density, the uncertainty in the average FFV is +/−0.01. This FFV value is much higher than that of low permeability, conventional, glassy polymers such as polysulfone (0.16) and polycarbonate (0.17). See Morisato, A.; Shen, H. C.; Sankar, S. S.; Freeman, B. D.; Pinnau, I.; Casillas, C. G. *J. Polym. Sci., Part B: Polym. Phys.* 1996, 34, 2209. The FFV is the same as that of highly permeable glassy polymers such as poly(1-trimethylsilyl-1-propyne) [PTMSP] (0.29), and is similar to the FFV values of random copolymers of tetrafluoroethylene [TFE] and 2,2-bistrifluoromethyl-4,5-difluoro-1,3-dioxole [PDD] (0.30 for PPD) 87 mol % and 0.28 PPD 65 mol %).

Table 3 summarizes permeability coefficients of this polymer film to various gases at 35° C. Consistent with the high fractional free volume value, the permeability coefficient to oxygen was 120 Barrers, which is very high relative to conventional glassy, aromatic polymers. In fact, Compound IIa is the most permeable glassy, hexafluoroisopropylidene-containing polymer known. The $O_2$ permeability of Compound IIa is similar to that of other very high free volume, glassy, fluorinated polymers. For example, poly(TFE-co-PDD) (PDD content=65 mol %, DuPont AF1600) has an $O_2$ permeability of 365 Barrers. These values are lower than those of the most permeable fluoropolymer known, poly(TFE-co-PDD) (PDD content=87 mol %: DuPont AF2400), which has an $O_2$ permeability coefficient of 1,380 Barrers.

TABLE 3

Gas Permeability of Poly[[1,1'-biphenyl]-4,4'-diyl]2,2,2-trifluoro-1-(trifluoromethyl)ethylidene]] (Compound IIa)

| Gases | Permeability Coefficients [Barrers][a] |
|---|---|
| He | 390 |
| $H_2$ | 470 |
| $CO_2$ | 470 |
| $O_2$ | 120 |
| $N_2$ | 41 |
| $CH_4$ | 34 |

[a]1 [Barrer] = $1 \times 10^{-10}$ cm³(STP)cm/(cm²-s-cm Hg), Film thickness: 30.3 μm Moreover, the permeability of Compound IIa is substantially lower than that of the most permeable polymer known, PTMSP, which has an $O_2$ permeability of 9,860 Barrers. See Freeman, B. D.; Hill A. J., Chapter 21 Free Volume Transport Properties of Barrier and Membrane Polymers, M. R. Tant and A. J. Hill Eds., ACS Symposium Series 1999, 710, 306.; Pinnau, I.; Toy, L. G., J. Membrane Sci. 1996, 116, 199. While all of these polymers are stiff chain, glassy polymers and have very high free volume, differences in the distribution of free volume elements probably also play a large role in determining gas permeation properties.

Figure 10:
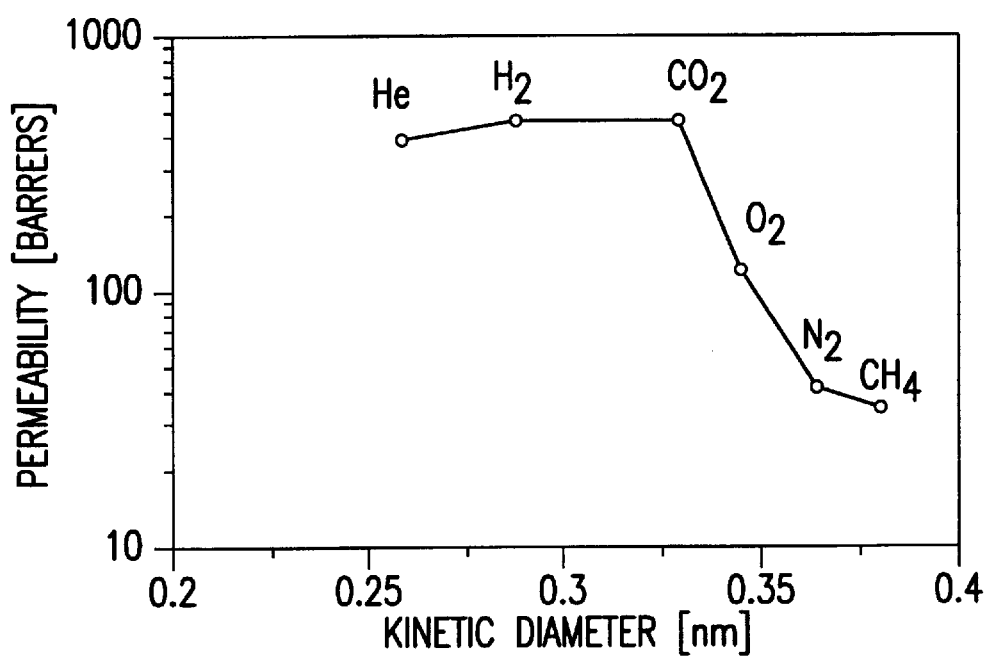
FIG. 10 shows the gas permeability coefficients of helium, hydrogen, carbon dioxide, oxygen, nitrogen and methane for Compound IIa, prepared according to the invention, as a function of penetrant kinetic diameter at 35 ° C. The figure indicates exceptional permeability properties including essentially the same permeability coefficient for hydrogen, helium and carbon dioxide despite the larger size of carbon dioxide molecules.

FIG. 10 presents gas permeability coefficients as a function of kinetic diameter, a parameter frequently used to characterize relative penetrant size for light gases. See Breck, D. W., Zeolite Molecular Sieves, Wiley, New York, 1974, 636. Suprisingly, the permeability coefficients of He, $H_2$, and $CO_2$ were rather similar, independent of gas size, and higher than those of the other gases considered. The permeabilty of Compound IIa to $O_2$, $N_2$, and $CH_4$ decreased with increasing penetrant size, consistent with a size sieving mechanism dominating penetrant transport.

The permeability coefficient of gases in polymers is typically expressed as the product of gas solubility and gas diffusivity in the polymer:

$$P_A = S_A \times D_A$$

where $P_A$ is the permeability coefficient of gas A, $S_A$ is the solubility coefficient of gas A in the polymer, and $D_A$ is the effective, concentration averaged diffusion coefficient of the gas in the polymer. As a result, both solubility and diffusivity contribute to overall permeability characteristics. The ability of a polymer to separate two gases depends on the polymer being more permeable to one gas than the other. In this regard, the ideal separation factor, or selectivity, $\alpha_{A/B}$, is defined as follows:

$$\alpha_{A/B} = P_A/P_B = S_A/S_B \times D_A/D_B$$

where $P_B$ is the permeability of the less permeable gas, and $S_B$ and $D_B$ are the solubility coefficient and diffusion coefficient of this gas in the polymer.

The permeability coefficient of $CO_2$ to Compound IIa was essentially the same as that of hydrogen, despite the larger size of $CO_2$. This result is unusual. Typically, polymers that are as permeable or more permeable to $CO_2$ than to $H_2$ are either rubbery polymers or ultrahigh free volume, disubstituted polyacetylenes, such as PTMSP. Stern, S.; Shah, V.; Hardy, B., J. Polym. Sci.: Polym. Phys. Ed. 1987, 25, 1263; Bondar, V. I.; Freeman, B. D.; Pinnau, I. Polym. Prepr. (Am. Chem. Soc., Polym. Mat. Sci. and Eng) 1997, 77, 311; Takada, K.; Matsuya, H.; Masuda T.; Higashimura, T., J. Appl. Polym. Sci. 1985, 30, 1605. Both classes of these polymers have a very weak size sieving ability (i.e. diffusion coefficients decrease only modestly with increasing penetrant size). Therefore, the natural tendency for $CO_2$ to be more soluble in polymers than $H_2$ (resulting from the more condensable nature of $CO_2$) is only partially offset by the slightly lower $CO_2$ diffusion coefficient, resulting in polymers that are more permeable to $CO_2$ than to $H_2$. Similary, methane is larger than nitrogen but is more soluble than nitrogen and, as a result, in such weakly size-sieving polymers, methane is more permeable than $N_2$.

Surprisingly, this is not the case for Compound IIa since it is more permeable to $N_2$ than to $CH_4$. These composite results suggest that the Compound IIa polymer matrix has a stronger ability to sieve penetrant molecules based on size than the rubbery polymers or ultrahigh free volume disubstituted polyacetylenes mentioned above, but that this characteristic is offset by a higher than usual $CO_2$ solubility.

High carbon dioxide solubility (relative to other gases) has been reported for other organic polymers having high concentrations of accessible fluorine groups. However, these polymers do not exhibit the exceptional flexibility, thermal stability and other properties associated with the fluorinated polymers of the invention. Examples include organopolysiloxanes bearing fluorinated side chains and poly(bis-trifluoroethoxyphosphazene). See Shah, V. M.; Hardy, B. J.; Stern, S. A. J Polym. Sci.: Part B:, Polym. Phys. 1993, 31, 313.; Hirose, T.; Kamiya, Y.; Mizoguchi, K., J. Appl. Polym. Sci. 1989, 38,809. These authors suggest that favorable interactions between fluorinated units in the polymer and carbon dioxide contribute to high $CO_2$ solubility. In this regard, the trifluoromethyl groups in the fluorinated polymers of the invention may interact favorably with carbon dioxide, which would enhance the permeability coefficient of this polymer to $CO_2$.

Separation factors of several industrial gas pairs are summarized in Table 4. Based on an exhaustive search of the polymer permeation literature, Robeson reported that the best combinations of permeability and selectivity obeyed a tradeoff rule: more permeable polymers are less selective and vice versa. See Robeson, L. M., J. Membrane Sci. 1991, 62, 165 hereby incorporated by reference. Polymers which have permeability and selectivity combinations beyond the so-called upper bound limits identified by Robeson are extremely rare.

Robeson reported quantitative relations between gas permeability and selectivity for many common gas pairs. Based on the measured permeability coefficients in Compound IIa, estimates of the selectivity of a hypothetical upper bound polymer with the same permeability coefficients were computed using the relations published by Robeson. These estimated selectivity values are also listed in Table 4 along with the selectivity values determined from the ratios of experimentally determined, pure gas permeability coefficients. All of the separation factors calculated based on the experimental permeability coefficients were lower than their calculated upper bound values. For example, the separation factors of oxygen over nitrogen and carbon dioxide and methane were 2.9 and 13.8, respectively. These values were 73% of their calculated upper bound values and are suprisingly closer to the upper bound selectivity values than those of the other gas pairs. Thus, the fluorinated polymers of the invention exhibit exceptional and rare permeability characteristics.

TABLE 4

Separation Factors of Poly[[1,1'-biphenyl]-4,4'-diyl[2,2,2-trifluoro-1-(trifluoromethyl)ethylidene]] (Compound IIa)

| Gas pairs | Robeson's Parameters[a] | | | P | Separation Factors | |
| --- | --- | --- | --- | --- | --- | --- |
| | k [Barrers] | n [−] | Gas | Barrers] | Exp. | Calc. |
| $H_2/N_2$ | 52,918 | −1.5275 | H2 | 470 | 11 | 22 |
| $H_2/O_2$ | 35,760 | −2.2770 | $H_2$ | 470 | 3.9 | 6.7 |
| $H_2/CH_4$ | 18,500 | −1.2112 | $H_2$ | 470 | 14 | 21 |
| $O_2/N_2$ | 389,224 | −5.8000 | $O_2$ | 120 | 2.9 | 4.0 |
| $CO_2/CH_4$ | 1,073,700 | −2.6264 | $CO_2$ | 470 | 14 | 19 |

[a]data from L. M. Robeson, J. Memrane Sci. 1991, 62, 165.
Separation factor = $(P_i/k)^{1/n}$ As Indicated in Table 2, Kapton (an aromatic polyimide) has similar flammability characteristics to Compound IIa. However, aromatic polyimides are usually much less permeable to gasses than Compound IIa. For example, conventional amorphous polyimides exhibit oxygen permeability coefficients of 0.4–16 Barrers and $O_2/N_2$ selectivity values of 4.7–8.3. The $O_2$ permeability coefficient of Compound IIa is 7.5–300 times larger than that of these conventional, thermally stable polyimides, and the $O_2/N_2$ selectively values are 35 to 62% of the values observed for the polyimides. Given the excellent thermal stability of Compound IIa and its separation properties, which are near the upper bound limits for some gas pairs, this polymer is useful as a high temperature membrane material.

Compound IIa exhibits excellent thermal and thermooxidative stability. The unique combination of thermal stability, minimal moisture absorption, and low dielectric constant indicates that this material and its analogues are promising for electronic applications. The fire resistance testing shows that this new polymer is comparable with other polymers in its class and exceeds present FAA standards. Compound IIa has a high free volume and is very gas-permeable for an aromatic, glassy polymer. Selectivity values for some gas pairs ($O_2/N_2$ and $CO_2/CH_4$) are near the upper bound limits suggested by Robeson. The initial gas permeability measurements suggest a high affinity for carbon dioxide relative to the other gases.

While the invention has been described with reference to specific embodiments, it will be apparent to those skilled in the art that many alternatives, modifications, and variations may be made. Accordingly, it is intended to embrace all such alternatives, modifications, and variations that may fall within the spirit and scope of the appended claims.

What is claimed as new and desired to be protected by Letters Patent of the United States is:

1. A polymer consisting essentially of units of aromatic-based compounds, at least one of said aromatic-based compounds being substituted with at least one $CF_3$ group, wherein said units are in the backbone of said polymer and do not contain elements other than carbon, hydrogen, fluorine, nitrogen and silicon.

2. The polymer of claim 1 wherein said at least one aromatic-based compound further comprises one $CF_3$ group.

3. The polymer of claim 1 wherein said at least one aromatic-based compound comprises at least one hexafluoroisopropylidene group.

4. The polymer of claim 1 further comprising at least two adjacent units of said at least one aromatic-based compound.

5. The polymer of claim 1, further comprising from 2 to 20 adjacent units of said aromatic-based compound.

6. The polymer of claim 1, wherein said polymer is a homopolymer.

7. The polymer of claim 1, wherein said polymer is an oligomer of from 2 to 20 of said units.

8. The polymer of claim 1, wherein said polymer is a copolymer.

9. The polymer of claim 1, wherein said polymer is soluble in at least one solvent selected from the group consisting of chloroform, acetone, tetrahyrdrofuran, methylene chloride, and N,N-dimethylformamide.

10. The polymer of claim 8, wherein said polymer is soluble at room temperature.

11. The polymer of claim 1, wherein said polymer has a glass transition temperature of about 200° C. to about 350° C.

12. The polymer of claim 1, wherein said polymer has about a 10% weight loss up to about 500° C. in air.

13. The polymer of claim 1, wherein said polymer has about a 10% weight loss up to about 500° C. in nitrogen.

14. The polymer of claim 1, wherein said polymer exhibits no weight loss from about 300° C. to 350° C.

15. The polymer of claim 1, wherein said polymer has a heat release capacity of about 25 J/(g K).

16. The polymer of claim 1, wherein a contact angle of at least 73.9° is detected after a drop of water is placed on said polymer.

17. The polymer of claim 1, wherein said polymer has a dielectric constant no greater than about 2.56.

18. The polymer of claim 1, wherein said polymer has a dielectric constant not significantly affected by humidity.

19. The polymer of claim 1, wherein said polymer is hydrolytically stable.

20. The polymer of claim 1, wherein a film prepared from said polymer does not degrade at 100° C. for up to at least 100 hours.

21. The polymer of claim 1, wherein a film prepared from said polymer is colorless.

22. The polymer of claim 1, wherein the permeability coefficient of said polymer to carbon dioxide, helium and hydrogen are substantially similar.

23. The polymer of claim 1, wherein said polymer is fire-resistant.

24. The polymer of claim 1, wherein said polymer has a fractional free volume of about 0.29.

25. The polymer of claim 1, wherein said polymer has a fractional free volume of about 0.29 and wherein said polymer is transparent, flexible, and creasible.

26. The polymer of claim 1, wherein the permeability coefficient of said polymer to carbon dioxide, helium, and hydrogen are substantially similar and wherein said polymer has a glass transition temperature of about 200° C. to 350° C.

27. The polymer of claim 8, wherein said polymer has a glass transition temperature of about 200° C. to about 350° C.

28. The polymer of claim 1 wherein said at least one aromatic-based compound is selected from the group consisting of Compounds IIIa, IIIb, IIIc, IIId, IIIe, IIIf, IIIg(1), IIIg(2), IIIh, IIIi, and IIIj.

29. The polymer of claim 1, wherein said at least one aromatic-based compound is present in the range of from about 1% to about 99% of the monomeric units of said polymer.

30. The polymer of claim 1, wherein said at least one aromatic-based compound is present in the range of from about 1% to about 50% of the monomeric units of said polymer.

31. The polymer of claim 1, wherein said at least one aromatic-based compound is present in the range of from about 1% to about 10% of the monomeric units of said polymer.

32. A polymer selected from the group consisting of Compounds IIa, IIc, IId, IIe, IIf, IIg(1), IIg(2), IIh, IIi, and IIj, wherein a backbone of said polymer does not contain elements other than carbon, hydrogen, fluorine, nitrogen and silicon.

33. A method of preparing a fluorinated polymer, comprising polymerizing monomers consisting essentially of aromatic-based compounds having functional groups, at least one of said functional groups of said aromatic-based compounds being substituted with at least one $CF_3$ group wherein said polymerizing is conducted via nickel(0)-catalyst coupling polymerization, whereby the backbone of said polymer does not contain elements other than carbon, hydrogen, fluorine, nitrogen and silicon.

34. The method of claim 33 wherein said at least one aromatic-based compound further comprises one $CF_3$ group.

35. The method of claim 33, wherein said at least one of said aromatic-based compounds comprises at least one hexafluoroisopropylidene group.

36. The method of claim 33, further comprising the step of copolymerizing a second aromatic-based compound comprising a dihalogenated aromatic-based compound.

37. The method of claim 33, wherein said second aromatic-based compound is benzene.

38. The method of claim 33, wherein said polymerization is conducted at a temperature of about 25° C. to 125° C.

39. The method of claim 38 wherein said temperature is from 80° C. to 100° C.

40. The method of claim 33, wherein at least one of said aromatic-based compounds comprises benzene.

41. The method of claim 40 wherein said benzene is disubstituted with at least one of chlorine or bromine.

42. A polymer comprising Compound IIa.

43. The polymer of claim 42, wherein said polymer is a homopolymer.

44. The polymer of claim 42, wherein said polymer is an oligomer of from 2 to 20 units.

45. The polymer of claim 42, wherein said polymer is a block copolymer.

46. The polymer of claim 42, wherein said polymer is soluble in at least one solvent selected from the group consisting of chloroform, acetone, tetrahydrofuran, methylene chloride, and N,N-dimethylformamide.

47. The polymer of claim 42, wherein said polymer is soluble at room temperature.

48. The polymer of claim 42, wherein said polymer has a glass transition temperature of about 200° C. to about 350° C.

49. The polymer of claim 42, wherein said polymer has about a 10% weight loss up to about 500° C. in air.

50. The polymer of claim 42, wherein said polymer has about a 10% weight loss up to about 500° C. in nitrogen.

51. The polymer of claim 42, wherein said polymer exhibits no weight loss from about 300° C. to 350° C.

52. The polymer of claim 42, wherein said polymer has a heat release capacity of about 25 J/(g K).

53. The polymer of claim 42, wherein a contact angle of at least 73.9° is detected after a drop of water is placed on said polymer.

54. The polymer of claim 42, wherein said polymer has a dielectric constant no greater than about 2.56.

55. The polymer of claim 42, wherein said polymer has a dielectric constant not significantly affected by humidity.

56. The polymer of claim 42, wherein said polymer is hydrolyticaily stable.

57. The polymer of claim 42, wherein a film cast from said polymer does not degrade at 100° C. for up to at least 100 hours.

58. The polymer of claim 42, wherein a film prepared from said polymer is colorless.

59. The polymer of claim 42, wherein the permeability coefficient of said polymer to carbon dioxide, helium and hydrogen are substantially similar.

60. The polymer of claim 42, wherein said polymer is fire-resistant.

61. The polymer of claim 42, wherein said polymer has a fractional free volume of about 0.29.

62. The polymer of claim 42, wherein said polymer has a fractional free volume of about 0.29 and wherein said polymer is transparent, flexible,.and creasible.

63. The polymer of claim 42, wherein the permeability coefficient of said polymer to carbon dioxide, helium, and hydrogen are substantially similar and wherein said polymer has a glass transition temperature of about 200° C. to about 350° C.

64. The polymer of claim 46, wherein said polymer has a glass transition temperature of about 200° C. to about 350° C.

* * * * *